United States Patent Office 3,078,636
Patented Feb. 26, 1963

3,078,636
UNSATURATED HYDROCARBON SEPARATION
Robert M. Milton, Buffalo, N.Y., assignor to Union
Carbide Corporation, a corporation of New York
Filed Dec. 18, 1959, Ser. No. 860,434
8 Claims. (Cl. 55—63)

This invention relates to a method for adsorbing fluids and separating a mixture of fluids into its component parts. More particularly, the invention relates to a method of adsorbing normal unsaturated aliphatic hydrocarbons containing less than four carbon atoms per molecule with adsorbents of the molecular sieve type. Still more particularly, the invention relates to a method for preferentially adsorbing acetylene, ethylene, and propylene from a fluid mixture containing at least one member of the group consisting of normal saturated aliphatic hydrocarbons containing less than four carbon atoms per molecule, oxygen, hydrogen and nitrogen.

Illustrating the utility of this invention, it may for example be desirable to remove acetylene from a hydrogen-containing stream when the latter is to be processed at low temperatures. This is because acetylene would deposit as a solid material and impair the operating efficiency of low temperature heat exchanges. With regard to ethylene adsorption, in the ethylene-air reaction to produce ethylene oxide, there is usually an excess of ethylene present in the off-gas from the reaction. This valuable component may be recovered for subsequent use from the off-gas by the present adsorption process.

Broadly, the invention comprises mixing molecules, in a fluid state, of the materials to be adsorbed or separated with at least partially dehydrated crystalline synthetic metal-aluminum-silicates, which will be described more particularly below, and effecting the adsorption of the adsorbate by the silicate. The synthetic silicate used in the process of the invention is in some respects similar to naturally occurring zeolites. Accordingly, the term "zeolite" would appear to be appropriately applied to these materials. There are, however, significant differences between the synthetic and natural silicates. To distinguish the synthetic material used in the method of the invention from the natural zeolites and other similar synthetic silicates, the sodium, aluminum-silicate and its derivatives taught hereinafter to be useful in the process of the invention will be designated by the term "zeolite A." While the structure and preferred method of making zeolite A will be discussed in some detail in this application, additional information about the material and its preparation may be found in an application filed December 24, 1953, Serial No. 400,388, now U.S. Patent No. 2,882,243 having issued April 14, 1959 in the name of R. M. Milton.

It is the principal object of the present invention to provide a process for the selective adsorption of molecules from fluids. A further object of the invention is to provide a method whereby certain molecules may be adsorbed and separated by crystalline synthetic metal-aluminum-silicate from fluid mixtures of those molecules and other molecules.

Figure 1:
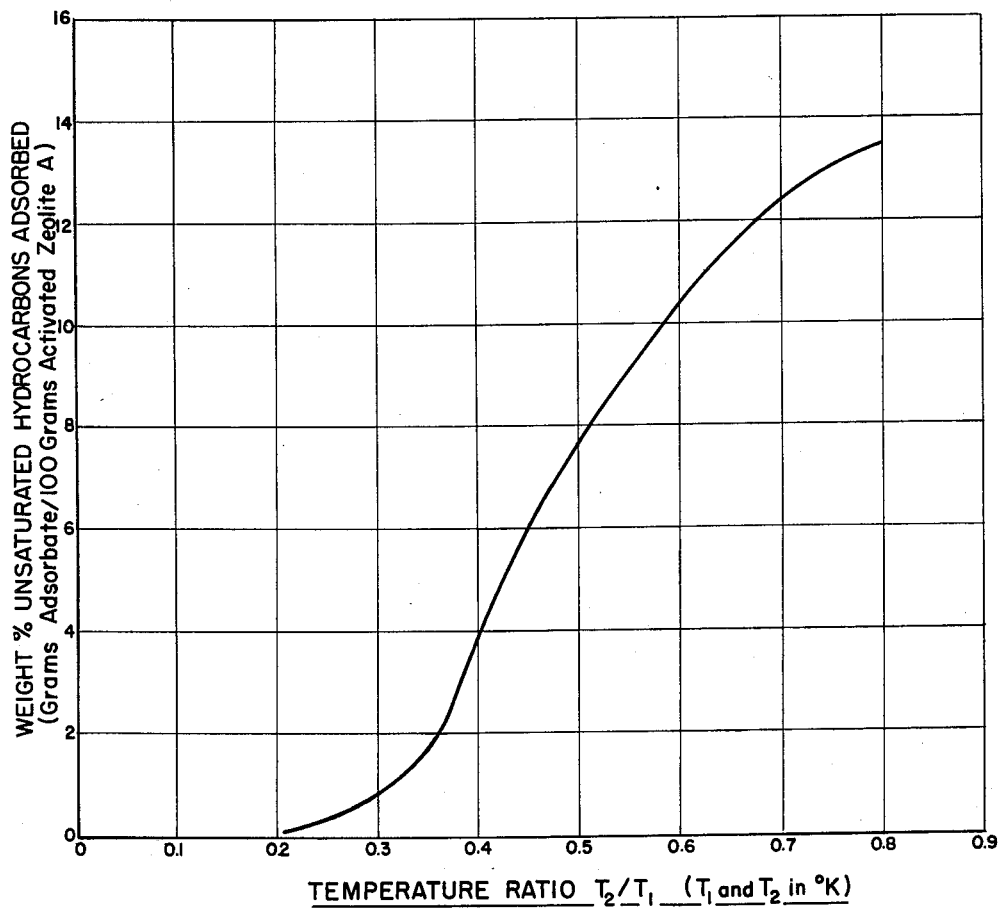
FIG. 1 is a graph showing the amount of $C_1$–$C_3$ normal unsaturated aliphatic hydrocarbons adsorbed versus the temperature ration $T_2/T_1$ for various cationic forms of zeolite A.

Certain adsorbents, including zeolite A, which selectively adsorb molecules on the basis of the size and shape of the adsorbate molecule are referred to as molecular sieves. These molecular sieves have a sorption area available on the inside of a large number of uniformly sized pores of molecular dimensions. With such an arrangement molecules of a certain size and shape enter the pores and are adsorbed while larger or differently shaped molecules are excluded. Not all adsorbents behave in the manner of the molecular sieves. Such common adsorbents as charcoal and silica gel, for example, do not exhibit molecular sieve action.

It is to be understood that the expression "Pore size," as used herein refers to the apparent pore size, as distinguished from the effective pore diameter. The apparent pore size may be defined as the maximum critical dimension of the molecular species which is adsorbed by the zeolitic molecular sieve in question, under normal conditions. Maximum critical dimension may be defined as the diameter of the smallest cylinder which will accommodate a model of the molecular constructed using the best available values of bond distances, bond angles, and Van der Waal radii. Effective pore diameter is defined as the free diameter of the appropriate silicate ring in the zeolite structure. The apparent pore size for a given zeolitic molecular sieve will always be larger than the effective pore diameter.

Zeolite A consists basically of a three-dimensional framework of $SiO_4$ and $AlO_4$ tetrahedra. The tetrahedra are cross-linked by the sharing of oxygen atoms so that the ratio of oxygen atoms to the total of the aluminum and silicon atoms is equal to two or $O/(Al+Si)=2$. The electrovalence of the tetrahedra containing aluminum is balanced by the inclusion in the crystal of a cation, for example, an alkali or alkaline earth metal ion. This balance may be expressed by the formula $Al_2/(Ca, Sr, Ba, Na_2, K_2)=1$. One cation may be exchanged for another by ion exchange techniques which are described below. The spaces between the tetrahedra are occupied by water molecules prior to dehydration.

Zeolite A may be activated by heating to effect the loss of the water of hydration. The dehydration results in crystals interlaced with channels of molecular dimensions that offer very high surface areas for the adsorption of foreign molecules. These interstitial channels will not accept molecules that have a maximum dimension of the minimum projected cross-section in excess of about 5.5 A. Factors influencing occlusion by the activated zeolite A crystals are the size and polarizing power of the interstitial cation, the polarizability and polarity of the occluded molecules, the dimensions and shape of the sorbed molecule relative to those of the channels, the duration and severity of dehydration and desorption, and the presence of foreign molecules in the interstitial channels.

Although there are a number of cations that may be present in zeolite A it is preferred to formulate or synthesize the sodium form of the crystal since the reactants are readily available and water soluble. The sodium in the sodium form of zeolite A may be easily exchanged for other cations as will be shown below. Essentially the preferred process comprises heating a proper mixture in aqueous solution of the oxides, or of materials whose chemical compositions can be completely represented as mixtures of the oxides, $Na_2O$, $Al_2O_3$, $SiO_2$, and $H_2O$, suitably at a temperature of about 100° C. for periods of time ranging from 15 minutes to 90 hours or longer. The product which crystallizes from the hot-mixture is filtered off and washed with distilled water until the effluent wash water in equilibrium with the zeolite has a pH of from about 9 to 12. The material, after activation, is ready for use as a molecular sieve.

Zeolite A may be distinguished from other zeolites and silicates on the basis of its X-ray powder diffraction pattern. The X-ray patterns for several of the ion exchanged forms of zeolite A are described below. Other characteristics that are useful in identifying zeolite A are its composition and density.

The basic formula for all crystalline zeolites where "M" represents a metal and "n" its valence may be represented as follows:

$$\frac{M_2}{n}O:Al_2O_3:XSiO_2:YH_2O$$

In general a particular crystalline zeolite will have values for X and Y that fall in a definite range. The value X for a particular zeolite will vary somewhat since the aluminum atoms and the silicon atoms both occupy essentially equivalent positions in the lattice. Minor variations in the relative numbers of these atoms do not significantly alter the crystal structure or physical properties of the zeolite. For zeolite A, numerous analyses have shown that an average value for X is about 1.85. The X value falls within the range 1.85±0.5.

The value of Y likewise is not necessarily an invariant for all samples of zeolite A particularly among the various ion exchanged forms of zeolite A. This is true because various exchangeable ions are of different size, and, since there is no major change in the crystal lattice dimensions upon ion exchange, more or less space should be available in the pores of the zeolite A to accommodate water molecules. For instance, sodium zeolite A was partially exchanged with magnesium, and lithium, and the pore volume of these forms, in the activated condition, measured with the following results:

| Ion Exchanged Form of Zeolite A | Percent Na Ions Replaced | Value of Y |
| --- | --- | --- |
| Na | 0 | 5.1 |
| Mg | 75 | 5.8 |
| K | 95 | 4 |
| Ca | 93 | 5 |

The average value for Y thus determined for the fully hydrated sodium zeolite A was 5.1; and in varying conditions of hydration, the value of Y can vary from 5.1 to essentially zero. The maximum value of Y has been found in 75% exchanged magnesium zeolite A, the fully hydrated form of which has a Y value of 5.8. In general an increase in the degree of ion exchange of the magnesium form of zeolite A results in an increase in the Y value. Larger values, up to 6, may be obtained with more fully ion exchanged materials.

In zeolite A synthesized according to the preferred procedure, the ratio $Na_2O/Al_2O_3$ should equal one. But if all of the excess alkali present in the mother liquor is not washed out of the precipitated product, analysis may show a ratio greater than one, and if the washing is carried too far, some sodium may be ion exchanged by hydrogen, and the ratio will drop below one. Thus, a typical analysis for a thoroughly washed sodium zeolite A is $0.99\ Na_2O:1.0\ Al_2O_3:1.85\ SiO_2:5.1\ H_2O$. The ratio $Na_2O/Al_2O_3$ has varied as much as 23%. The composition for zeolite A lies in the range of $$\frac{\frac{M_2}{n}O}{Al_2O_3}=1.0\pm 0.2$$

where "M" represents a metal and "n" its valence.

Thus the formula for zeolite A may be written as follows:

$$1.0\pm 0.2\frac{M_2}{n}O:Al_2O_3:1.85\pm 0.5SiO_2:YN_2O$$

In this formula "M" represents a metal, "n" its valence, and "Y" may be any value up to 6 depending on the identity of the metal and the degree of dehydration of the crystals.

The pores of zeolite A are normally filled with water and in this case, the above formula represents their chemical analysis. When other materials as well as water are in the pores of zeolite A, chemical analysis will show a lower value of Y and the presence of other adsorbates. The presence in the pores of non-volatile materials, such as sodium chloride and sodium hydroxide, which are not removable under normal conditions of activation at temperatures of from 100° C. to 650° C. does not significantly alter the crystal lattice or structure of zeolite A although it will of necessity alter the chemical composition.

The apparent density of fully hydrated samples of zeolite A were determined by the flotation of the crystals on liquids of appropriate densities. The technique and liquids used are discussed in an article entitled "Density of Liquid Mixture" appearing in Acta Crystallographiea, 1951, vol. 4, page 565. The densities of several such crystals are as follows:

| Form of Zeolite A | Percent of Exchange | Density, g./cc. |
| --- | --- | --- |
| Sodium | 100 | 1.99±0.1 |
| Lithium | 65 | 1.92±0.1 |
| Potassium | 95 | 2.08±0.1 |
| Cesium | 31 | 2.26±0.1 |
| Magnesium | 75 | 2.04±0.1 |
| Calcium | 93 | 2.05±0.1 |
| Thallous | 80 | about 3.36 |

In making the sodium form of zeolite A, representative reactants are silica gel, silica acid or sodium silicate as a source of silica. Alumina may be obtained from activated alumina, gamma alumina, alpha alumina, alumina trihydrate, or sodium aluminate. Sodium hydroxide may supply the sodium ion and in addition assist in controlling the pH. Preferably the reactants are water soluble. A solution of the reactants in the proper proportions is placed in a container, suitably of metal or glass. The container is closed to prevent loss of water and the reactants heated for the required time. A convenient and preferred procedure for preparing the reactant mixture is to make an aqueous solution containing the sodium aluminate and hydroxide and add this, preferably with agitation, to an aqueous solution of sodium silicate. The system is stirred until homogeneous or until any gel which forms is broken into a nearly homogeneous mix. After this mixing, agitation may be stopped as it is unnecessary to agitate the reacting mass during the formation and crystallization of the zeolite, however, mixing during formation and crystallization has not been found to be detrimental. The initial mixing of ingredients is conveniently done at room temperature but this is not essential.

In the synthesis of zeolite A, it has been found that the composition of the reacting mixture is critical. The crystallizing temperature and the length of time the crystallizing temperature is maintained are important variables in determining the yield of crystalline material. Under some conditions, for example too low a temperature for too short a time, no crystalline materials are produced. Extreme conditions may also result in the production of materials other than zeolite A.

The sodium form of zeolite A has been produced at 100° C., essentially free from contaminating materials, from reacting mixtures whose compositions, expressed as mixtures of the oxides, fall within either of the following ranges.

| | Range 1 | Range 2 |
| --- | --- | --- |
| $SiO_2/Al_2O_3$ | 0.5–1.3 | 1.3–2.5 |
| $Na_2O/SiO_2$ | 1.0–3.0 | 0.8–3.0 |
| $H_2O/Na_2O$ | 35–200 | 35–200 |

When zeolite A has been prepared, mixed with other materials, the X-ray pattern of the mixture can be reproduced by a simple preportional addition of the X-ray patterns of the individual pure components.

Other properties, for instance molecular sieve selectivity, characteristic of zeolite A are present in the properties of the mixture to the extent that zeolite A is part of the mixture.

The adsorbents contemplated herein include not only the sodium form of zeolite A as synthesized above from a sodium-aluminum-silicate-water system with sodium as the exchangeable cation but also crystalline materials obtained from such a zeolite by partial or complete replacement of the sodium ion with other cations. The sodium cations can be replaced at least in part, by other ions. These replacing ions can be classified in the following groups; metal ions in group I of the periodic table such as lithium and silver, with the exception of potassium, and group II metal ions such as calcium and strontium with the exception of barium.

The preparation of other cationic metal zeolites is too complex for use in the present invention.

The spatial arrangement of the aluminum, silicon, and oxygen atoms which make up the basic crystal lattice of the zeolite remains essentially unchanged by partial or complete substitution of the sodium ion by other cations. The X-ray patterns of the ion exchanged forms of the zeolite A show the same principal lines at essentially the same positions, but there are some differences in the relative intensities of the X-ray lines, due to the ion exchange.

Ion exchange of the sodium form of zeolite A (which for convenience may be represented as $Na_2A$) or other forms of zeolite A may be accomplished by conventional ion exchange methods. A preferred continuous method is to pack zeolite A into a series of vertical columns with suitable supports at the bottom; successively pass through the beds a water solution of a soluble salt of the cation to be introduced into the zeolite; and change the flow from the first bed to the second bed as the zeolite in the first bed becomes ion exchanged to the desired extent.

To obtain hydrogen exchange, a water solution of an acid such as hydrochloric acid is effective as the exchanging solution. For sodium exchange, a water solution of sodium chloride is suitable. Other convenient reagents are: for potassium exchange, a water solution of potassium chloride or dilute potassium hydroxide (pH not over about 12); for lithium, magnesium, calcium, ammonium, nickel, or strontium exchange, water solutions of the chlorides of these elements; for zinc exchange, a water solution of zinc nitrate; and for silver exchange, a silver nitrate solution. While it is more convenient to use water soluble compounds of the exchange cations, other solutions containing the desired cations or hydrated cations may be used.

Among the ways of identifying zeolite A and distinguishing it from other zeolites and other crystalline substances, the X-ray powder diffraction pattern has been found to be a useful tool. The pattern for zeolite A is shown in the previously mentioned U.S. Patent No. 2,882,243, incorporated herein by reference.

The zeolities contemplated herein exhibit adsorptive properties that are unique among known adsorbents. The common adsorbents, like charcoal and silica gel, show adsorption selectivities based primarily on the boiling point or critical temperature of the adsorbate. Activated zeolite A on the other hand exhibits a selectivity based on the size and shape of the adsorbate molecule. Among those adsorbate molecules whose size and shape are such as to permit adsorption by zeolite A, a very strong preference is exhibited toward those that are unsaturated. Another property of zeolite A that contributes to its unique position among adsorbents is that of adsorbing large quantities of adsorbate either at very low pressures, at very low partial pressures, or at very low concentrations. One or a combination of one or more of these three adsorption characteristics or others can make zeolite A useful for numerous gas or liquid separation processes where adsorbents are not now employed. The use of zeolite A permits more efficient and more economical operation of numerous processes now employing other adsorbents.

Common adsorbents like silica gel and charcoal do not exhibit any appreciable molecular sieve action whereas the various forms of zeolite A do. This is shown in the tables following in the specification, for typical samples of the adsorbents. In these tables the term "Weight percent adsorbed" refers to the percentage increase in the weight of the adsorbent. The adsorbents were activated by heating them at a reduced pressure to remove adsorbed materials. Throughout the specification the activation temperature for zeolite A was 350° C. and the pressure at which it was heated as less than about 0.1 millimeter of mercury absolute unless otherwise specified. Throughout the specification, unless otherwise indicated, the pressure given for each absorption is the pressure of the adsorbate at the adsorption conditions.

In the series of straight chain unsaturated hydrocarbons, the $C_2$ and $C_3$ molecules are adsorbed but the higher homologs are only slightly adsorbed. This is shown in the data below for a typical sodium zeolite A. An exception is butadiene, a doubly unsaturated $C_4$.

| Adsorbate | Temperature (° C.) | Pressure (mm. Hg) | Weight Percent Adsorbed on $Na_2A$ |
|---|---|---|---|
| Ethylene | 25 | 200 | 8.4 |
| Propylene | 25 | 200 | 11.3 |
| Butene-1 | 25 | 200 | 2.3 |
| Butadiene | 25 | 9.0 | 13.7 |

This sieving action toward unsaturated hydrocarbons permits the separation of the smaller, shorter, lower molecular weight unsaturates such as ethylene, acetylene, propylene and the doubly unsaturated $C_4$ hydrocarbons from the larger, longer, heavier unsaturated and saturated hydrocarbons that are not appreciably adsorbed, or only weakly adsorbed and from gases that are only weakly adsorbed because of their low boiling points, such as $O_2, N_2, H_2, CO$ and $CH_4$, and from molecules that are too large to be adsorbed such as the cyclic molecules having four or more atoms in the ring.

In borderline cases where adsorbate molecules are too large to enter the pore system of the zeolite freely, but are not large enough to be excluded entirely, there is a finite rate of adsorption and the amount adsorbed will vary with time. In general, the recorded data represents the adsorption occurring within the first one or two hours, and for some borderline molecules, further adsorption may be expected during periods of ten to fifteen hours. Washing techniques, different heat treatments and the crystal size of the sodium zeolite A powder can cause very appreciable differences in adsorption rates for the borderline molecules.

The calcium and magnesium exchanged zeolite A have molecular sieve adsorptive properties characteristic of materials with larger pores than exist in sodium zeolite A. These two forms of divalent ion exchanged zeolite A behave quite similarly and adsorb all molecules adsorbed by sodium zeolite A plus some larger molecules.

The calcium and magnesium forms of zeolite A have a pore size that will permit adsorption of molecules for which the maximum dimension of the minimum projected cross-section is approximately 4.9 A. but not larger than about 5.5 A.

There are numerous other ion exchanged forms of zeolite A such as lithium, ammonium, silver, zinc, nickel, hydrogen, and strontium. In general, the divalent ion exchanged materials such as zinc, nickel, and strontium zeolite A have a sieving action similar to that of calcium and magnesium zeolite A, and the monovalent ion exchanged materials such as lithium and hydrogen zeolite A behave similarly to sodium zeolite A, although some differences exist.

Another unique property of zeolite A is its strong preference for unsaturated molecules, providing, of course, that these molecules are of a size and shape permitting them to enter the pore system of the zeolites. This is in contrast to charcoal and silica gel which show a main preference based on the volatility of the adsorbate. The following table compares the adsorption of acetylene, an unsaturated molecule on charcoal, silica gel and sodium zeolite A. The table illustrates the high capacity the zeolite A has for unsaturated molecules.

The greater the degree of unsaturation, the greater the affinity of zeolite A for the adsorbate. This is illustrated in the following tables with a series of $C_2$ hydrocarbons on sodium zeolite A.

| Pressure (mm. Hg) | Temperature (°C.) | Weight Percent Adsorbed on $Na_2A$ | | |
|---|---|---|---|---|
| | | $C_2H_6$ | $C_2H_4$ | $C_2H_2$ |
| 1 | 25 | 0.4 | 1.7 | 3.7 |
| 5 | 25 | 1.2 | 4.3 | 6.6 |

These data, indicating strong adsorption for the unsaturated molecules, show that unsaturated molecules may be separated from saturated molecules or less unsaturated molecules even though all are of approximately the same size and small enough to enter the pore system of zeolite A, having a pore size of at least about 4 A. Specifically, it shows a propensity for separating acetylene from both ethylene and ethane and from other saturated hydrocarbons, such as methane and propane, and from molecules that are less strongly adsorbed because of their low boiling points, such as nitrogen, oxygen, hydrogen, and carbon monoxide.

A selectivity for unsaturated molecules is not new among adsorbents. Silica gel exhibits some preference for such molecules, but the extent of this selectivity is so much greater with zeolite A that separation processes based upon this selectivity becomes feasible. For example, if a sample of activated sodium zeolite A is brought to equilibrium at one atmosphere of pressure and 25° C. with a gas mixture composed of 20% ethylene and 80% ethane, the adsorbed phase contains more than six times much ethylene as ethane. Silica gel on the other hand has more ethane than ethylene in the adsorbed phase under similar conditions.

A further important characteristic of zeolite A is its property of absorbing large amounts of adsorbates at low adsorbate pressures, partial pressures or concentrations. This property makes zeolite A uniquely useful in the more complete removal of adsorbable impurities from gas and liquid mixtures. It gives them a relatively high adsorption capacity even when the material being adsorbed from a mixture is present in very low concentrations, and permits the efficient recovery of minor components of mixtures. This characteristic is all the more important since adsorption processes are most frequently used when the desired component is present in low concentrations or low partial pressures. High adsorptions at low pressures or concentrations on zeolite A are illustrated in the following table, along with some comparative data for silica gel and charcoal.

The adsorption capacity of adsorbents usually decreases with increasing temperature, and while the adsorption capacity of an adsorbent at a given temperature may be sufficient, the capacity may be wholly unsatisfactory at a higher temperature. With zeolite A a relatively high capacity may be retained at higher temperatures.

Zeolite A may be activated by heating it in either air, a vacuum, or other appropriate gas to temperature of as high as 600° C. The conditions used for desorption of an adsorbate from zeolite A vary with the adsorbate, but either raising the temperature or reducing the pressure, partial pressure or concentration of the adsorbate in contact with the adsorbent or a combination of these steps is usually employed. Another method is to displace the adsorbate by adsorption of another more strongly held adsorbate.

The present process for separating normal unsaturated aliphatic hydrocarbons containing less than four carbon atoms per molecule from certain vapor mixtures depends upon interrelated properties of zeolite A with respect to the adsorbed phase. A property which has been previously discussed is the crystal pore size which will admit or reject molecules on a size basis. A second property is the greater affinity of zeolite A for hydrocarbon molecules of increasing unsaturation.

Another interrelated property is the relationship of the boiling point or vapor tension characteristics of an individual fluid or clearly related type of fluid to the capacity of the crystalline zeolite to adsorb the fluid at a given temperature and pressure. More specifically, it has been discovered that a relationship exists between the amount of fluid adsorbed and the temperature ratio $T_2/T_1$ where $T_1$ is the temperature in degree Kelvin during adsorption, assuming that the temperature of the fluid and the adsorbent are in equilibrium. $T_2$ is the temperature in degrees Kelvin at which the vapor pressure of the fluid is equal to the partial pressure or vapor tension of the fluid in equilibrium with the zeolite adsorbent. Stated in another way, $T_2$ is the temperature at which the vapor pressure of the adsorbate is equal to the partial pressure of the adsorbate during adsorption. $T_2$ is actually the dew point of the adsorbate at the adsorption conditions.

This relationship is clearly shown in FIG. 1 which is a plot of the weight percent of hydrocarbons adsorbed versus the temperature ratio $T_2/T_1$ for both monovalent and divalent cationic forms of zeolite A having a pore size of at least 4 A. The adsorbate in all examples are normal unsaturated aliphatic hydrocarbons containing less than four carbon atoms per molecule namely acetylene, ethylene and propylene. The following Table C is a summary of the data from which FIG. 1 was prepared, the data for the first eight examples having been assembled from tests described in more detail in other parts of the specification. That is the $T_1$ values for these examples were obtained from the preceding portion of the specification and the $T_2$ values were read from the vapor pressure tables in "Industrial and Engineering Chemistry," vol. 39, page 517, April 1947.

TABLE C

| Ion Form Zeolite A | Hydrocarbon | | Weight Percent Adsorbed | Temp., °K. | | $T_2/T_1$ |
|---|---|---|---|---|---|---|
| | Type | P | | $T_1$ | $T_2$ | |
| Na | $C_2H_4$ | 200 mm. Hg | 8.4 | 293 | 150 | 0.50 |
| Na | $C_2H_4$ | 5 mm. Hg | 4.3 | 293 | 115 | 0.39 |
| Na | $C_2H_4$ | 1 mm. Hg | 1.7 | 298 | 105 | 0.35 |
| Ca | $C_3H_6$ | 49 mm. Hg | 12.1 | 298 | 179 | 0.60 |
| Ca | $C_3H_6$ | 2 mm. Hg | 8.1 | 293 | 145 | 0.49 |
| Na | $C_2H_2$ | 50 mm. Hg | 9.5 | 298 | 158 | 0.53 |
| Na | $C_2H_2$ | 5 mm. Hg | 6.6 | 298 | 140 | 0.47 |
| Na | $C_2H_2$ | 1 mm. Hg | 4.7 | 298 | 130 | 0.44 |
| Ca | $C_2H_4$ | 100 p.s.i.a | 11.2 | 313 | 211 | 0.68 |
| Ca | $C_2H_4$ | 1.05 p.s.i.a | 4.5 | 339 | 135 | 0.40 |
| Ca | $C_2H_4$ | 2.85 p.s.i.a | 5.6 | 339 | 145 | 0.43 |
| Ca | $C_2H_4$ | 1.05 p.s.i.a | 3.0 | 366 | 135 | 0.37 |
| Ca | $C_2H_4$ | 1.85 p.s.i.a | 4.3 | 366 | 145 | 0.40 |
| Ca | $C_2H_4$ | 3.78 p.s.i.a | 4.8 | 366 | 149 | 0.41 |
| Ca | $C_2H_4$ | 7.5 p.s.i.a | 5.4 | 366 | 159 | 0.43 |
| Ca | $C_2H_4$ | 14.4 p.s.i.a | 6.8 | 366 | 170 | 0.46 |
| Ca | $C_2H_4$ | 10 p.s.i.a | 9.1 | 366 | 210 | 0.57 |
| Ca | $C_2H_4$ | 1.05 p.s.i.a | 1.9 | 394 | 135 | 0.34 |
| Ca | $C_2H_4$ | 2.85 p.s.i.a | 3.1 | 394 | 147 | 0.37 |
| Ca | $C_2H_4$ | 7.5 p.s.i.a | 4.0 | 394 | 149 | 0.40 |
| Ca | $C_2H_4$ | 7.5 p.s.i.a | 3.0 | 422 | 159 | 0.38 |
| Ca | $C_2H_4$ | 14.5 p.s.i.a | 3.8 | 422 | 170 | 0.40 |
| Ca | $C_2H_4$ | 100 p.s.i.a | 7.1 | 422 | 211 | 0.50 |
| Ca | $C_2H_4$ | 14.7 p.s.i.a | 2.0 | 477 | 170 | 0.36 |
| Ca | $C_2H_4$ | 130 p.s.i.a | 5.3 | 477 | 211 | 0.44 |
| Ca | $C_2H_4$ | 100 p.s.i.a | 3.5 | 477 | 211 | 0.40 |
| Na | $C_2H_4$ | 10 mm. Hg | 6.8 | 298 | 119 | 0.40 |
| Na | $C_2H_4$ | 10 mm. Hg | 6.8 | 298 | 119 | 0.40 |
| Na | $C_2H_4$ | 750 mm. Hg | 10.3 | 298 | 170 | 0.57 |
| Na | $C_2H_2$ | 10 mm. Hg | 8.2 | 298 | 149 | 0.50 |
| Na | $C_2H_2$ | 200 mm. Hg | 10.2 | 298 | 173 | 0.58 |

An inspection of Table C will reveal that it includes acetylene, ethylene and propylene at temperatures from 25° C. to 204° C. and adsorbate pressures from 1 mm. Hg to 100 p.s.i.a. It was unexpectedly discovered that all of the normal unsaturated aliphatic hydrocarbons having less than four carbon atoms per molecule being freely adsorbed on zeolite A exhibit the same temperature ration $T_2/T_1$ relationship to weight percent of hydrocarbon adsorbed. That is, for a given $T_2/T_1$ value, the weight percent of hydrocarbon adsorbed will be the same for all of the previously defined hydrocarbons. The present invention utilizes this relationship in combination with the previously mentioned selective properties of certain crystalline zeolitic molecular sieves, to provide a novel separation process.

The present invention combines the previously discussed properties of zeolite A in such a manner that a novel process is provided for separating normal unsaturated aliphatic hydrocarbons containing less than four carbon atoms per molecule from a vapor mixture containing at least one member of the group consisting of normal saturated aliphatic hydrocarbons containing less than four carbon atoms per molecule, oxygen, hydrogen and nitrogen. In its broadest form, the process consists of contacting the vapor mixture with a bed of at least partially dehydrated crystalline zeolite A adsorbent material. The normal unsaturated aliphatic hydrocarbon-depleted vapor mixture is then discharged from the crystalline zeolite A bed. Such contact is preferably effected under conditions such that the temperature ratio $T_2/T_1$ with respect to the inlet end of the bed and with respect to at least one of the normal unsaturated aliphatic hydrocarbons of the vapor mixture is between 0.35 and 1.0, where $T_1$ is the adsorption temperature and is less than 873° K., and $T_2$ is the temperature at which the one normal unsaturated aliphatic hydrocarbon has a vapor pressure equal to its partial pressure in the vapor mixture. The lower limit of 0.35 for the temperature ratio $T_2/T_1$ is fixed by the discovery that below this value there is a smaller percentage change in adsorption capacity per unit change in the temperature ration. In contrast, above 0.35 there is a larger percentage change in adsorption capacity per unit change in the temperature ration. Stated in another way, if it is desired to obtain a certain incremental adsorbate loading at a specified adsorption temperature with a given feed stream, it would be necessary to increase the pressure of operation by a greater percent if the temperature ration is below 0.35 than if it is maintained above this value in accordance with the invention. Also, the temperature ration of 0.35 corresponds to a bed loading of 1.7 weight percent adsorbate and if the temperature ratio were reduced below this value, a larger adsorption bed would be required with its attendant higher investment and operating expenses.

The upper limit of 1.0 for the temperature ratio should not be exceeded, because if the adsorption temperature is equal to or less than the dew point, condensation of the aliphatic hydrocarbon will occur, thereby essentially eliminating the sieving action of the zeolite A adsorbent. The broad upper limit of 873° K. for $T_1$ is due to the fact that above this temperature, the crystal structure of zeolite A will be disrupted or damaged with consequent loss of adsorption capacity and reduction in pore size, thereby fundamentally changing its adsorptive characteristics.

For acetylene adsorption, the present process is most efficiently performed if $T_1$, the adsorption temperature is less than 477° K. but higher than 233° K. This is for the reason that above such range, the acetylene in contact with zeolite A will tend to isomerize, hydrogenate, aromatize and polymerize, all of which will clog the pores and cause loss of capacity of zeolite A molecular sieve. Below 233° K. relatively economical refrigerants such as Freon-12 cannot be employed, thereby necessitating more expensive refrigerating systems. Also, the mechanical properties of metals decrease rapidly below about 233° K., so that special construction materials must be employed for adsorbers operating in this low temperature range. The increase in zeolite A adsorptive capacity for acetylene at reduced temperatures justifies the employment of refrigeration down to the 233° K. level. Furthermore for maximum efficiency, $T_2$ is preferably below 313° K. which is the critical temperature of acetylene. This is to more effectively utilize the adsorptive capacity of zeolite A.

For olefin adsorption, the present process is most efficiently performed if $T_1$, the adsorption temperature, is less than 533° K. but higher than 233° K. This is for the reason that above this range, the olefin in contact with zeolite A will tend to isomerize, hydrogenate, aromatize and polymerize all of which will clog the pores and cause loss of capacity of zeolite A molecular sieve. The reason for the preferred lower limit of 233° K. is the same as previously discussed for acetylene adsorption. Also, for maximum efficiency, $T_2$ is preferably below 364° K., the critical temperature of propylene. If only ethylene is present, $T_2$ is preferably below 283° K., the critical temperature of ethylene. To more effectively utilize the adsorptive capacity of zeolite A.

The present invention also contemplates a process for continuously separating normal unsaturated aliphatic hydrocarbons containing less than four carbon atoms per molecule from a vapor mixture containing at least one member of the group consisting of normal saturated aliphatic hydrocarbons containing less than four carbon atoms per molecule, oxygen, hydrogen and nitrogen. This continuous process includes two steps, an absorption stroke and a regeneration stroke. The adsorption stroke is the same as the previously described adsorption where the temperature ratio $T_2/T_1$ is between 0.35 and 1.0, and the broad range for $T_1$ is less than 873° K. In the regeneration stroke, at least part of the adsorbed normal unsaturated aliphatic hydrocarbon is removed by subjecting the zeolite A adsorbent to conditions such that the temperature ratio $T_2/T_1$ at the end of the regeneration stroke with respect to at least one of the adsorbed normal unsaturated aliphatic hydrocarbons, is less than the temperature ratio at the end of the adsorption stroke. Also, the difference in total adsorbate loading between the ends of the adsorption and regeneration strokes is at least 0.1 weight percent for increased efficiency of the overall continuous process. A lower differential adsorbate loading would entail prohibitively large absorber units. During the regeneration stroke, $T_1$ is the regeneration temperature and is less than 873° K. for the broad range, and $T_2$ is the temperature at which the previously mentioned one adsorbed normal unsaturated aliphatic hydrocarbon has a vapor pressure equal to the partial pressure of the hydrocrabon over the zeolite A bed at the end of the regeneration. It will be understood by those skilled in the art that at least two absorbent beds may be provided, with one bed on adsorption stroke and the other bed on regeneration stroke. The respective flows are then periodically switched when the first bed becomes loaded with the absorbate, so that the latter is placed on regeneration stroke and the second bed is placed on-stream.

For acetylene adsorption, the continuous process is most efficiently performed if $T_1$, the adsorption temperature, is less than 477° K. but higher than 233° K. for previously stated reasons. Also, for maximum efficiency during the adsorption stroke, $T_2$ is below 313° K. During the regeneration stroke, $T_1$ is preferably below 477° K. and above 233° K., also for the previously discussed reasons.

For olefin adsorption, the continuous process is most efficiently performed if $T_1$, the adsorption temperature is less than 533° K. but higher than 233° K. for previously stated reasons. Also, for maximum efficiency during the adsorption stroke, $T_2$ is below 364° K. During the regeneration stroke, $T_1$ is preferably below 533° K. and above 233° K., also for the previously discussed reasons. Finally, the difference in total olefin loadings between the ends of the adsorption and regeneration strokes is preferably at least 0.5 weight percent. This is for the reason that the olefin adsorbate is preferably recovered from the zeolitic molecular sieve bed as a valuable product, thereby necessitating a relatively high loading differential to warrant such recovery.

It will be understood by those skilled in the art that the temperature ratio may be adjusted by well-known methods, as for example, heating the bed by direct or indirect heat transfer, employing a purge gas, or by drawing a vacuum on the bed during the regeneration stroke. Also, during the regeneration stroke the ratio may be adjusted for favorable operation by varying either or both the temperature and the pressure.

The many advantages of the invention are illustrated by the following examples:

Example I

A vapor mixture is provided containing 0.2 mole fraction ethylene, the remainder being ethane, at a total pressure of 1 atmosphere. The mixture is to be contacted with a bed of calcium zeolite A at a temperature of 25° C. The zeolite A bed is to be regenerated by vacuum desorption and simultaneously heating the bed.

The potential capacity of the bed to adsorb ethylene at the bed inlet section may be determined as follows: Since the partial pressure of ethylene is 2.94 p.s.i.a., $T_2$ will be 144° K., as read from the previously referenced vapor pressure table. Accordingly, $T_2/T_1$ will be 144/298 or 0.48. This temperature ratio will provide a loading of 7 weight percent of ethylene on the zeolite A adsorbent as determined by a reading of the FIG. 1 graph. The potential capacity of the absorbent bed inlet end for ethane may be determined in a similar manner so that the value for ethane is 7.7 weight percent. Although this indicates that both components are equally strongly adsorbed, it was unexpectedly found by experimentation that zeolite A has a remarkably higher selectivity for unsaturated than for saturated aliphatic hydrocarbons, even if they have the same number of carbon atoms. More specifically, it was experimentally found that calcium zeolite A adsorbs six times as much ethylene as ethane under the conditions of Example I. The adsorption stroke may be terminated when traces of ethylene first appear in the effluent, if complete elimination of ethylene from the effluent is desired.

During the regeneration stroke, the bed temperature is raised to 380° K. while simultaneously reducing the pressure of the bed to 50 mm. Hg correspondingly to a $T_2$ value of 133° K. with respect to ethylene. Under these conditions, the $T_2/T_1$ ratio will be 0.35 and the residual loading of ethylene will be reduced to 1.7 weight percent.

Example II

Figure 2:
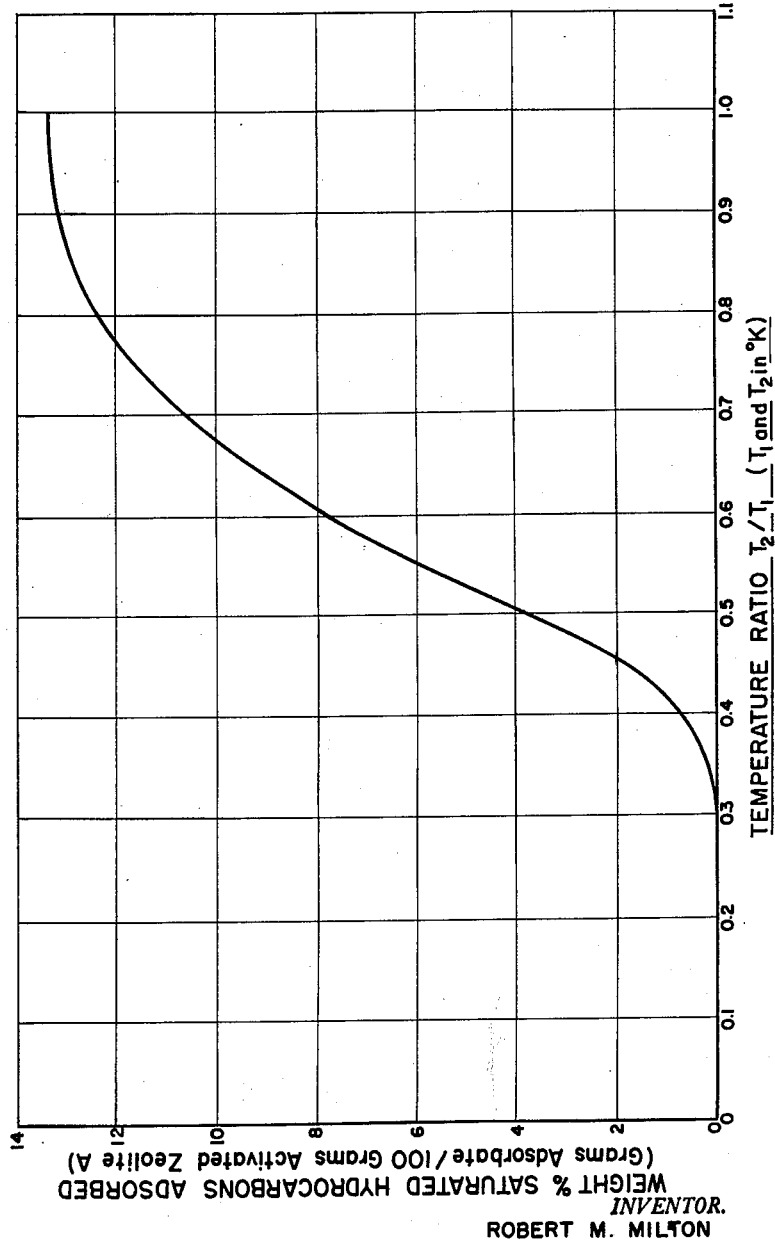
FIG. 2 is a graph showing the amount of $C_1$–$C_4$ normal saturated aliphatic hydrocarbons adsorbed versus the temperature ration $T_2/T_1$ for various cationic forms of zeolite A.
Figure 3:
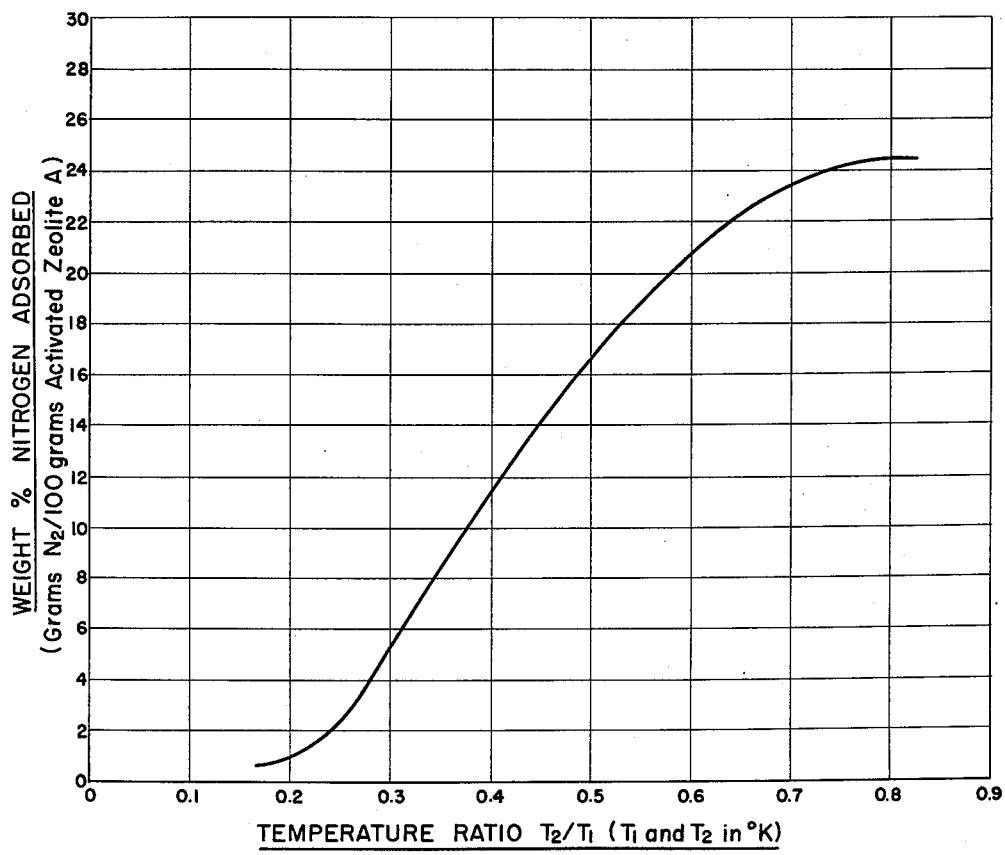
FIG. 3 is a graph showing the amount of nitrogen adsorbed versus the temperature ration $T_2/T_1$ for various cationic forms of zeolite A.

A vapor mixture is provided containing 0.005 mole fraction acetylene from a methane stream at 500 p.s.i.a. The mixture is contacted with a bed of sodium zeolite A at 25° C. and may be regenerated by heating the feed stream and passing it therethrough as a purge gas. Under these conditions, the potential capacity of the bed to absorb these hydrocarbons at the bed inlet section may be determined in the same manner as previously described in conjunction with Example I. That is, for acetylene at the bed inlet section, $T_2$ will be 168° K. so that the temperature ratio is 0.45 which corresponds to a loading of about 6 weight percent acetylene on the absorbent, as read from FIG. 1. The potential capacity of the absorbent bed inlet end for methane may be determined in a similar manner and is found to be about 3 weight percent, as read from FIG. 2.

Assuming a desired residual acetylene loading of less than 2.4 weight percent, regeneration of the sodium zeolite A used in Example II can be readily achieved by heating the feed gas to 455° K. (182° C.), for purging purposes. This temperature is based on a $T_2/T_1$ value of 0.37 as read from FIG. 1 at a loading of 2.4% and a $T_2$ of 168° K.

Alternatively, if regeneration is to be effected by drawing a vacuum pressure of 50 mm. Hg on the bed, $T_2$ would be 158° K. This temperature corresponds to the vapor pressure of acetylene at 50 mm. Hg, as read from the previously referenced table. Since the residual acetylene loading is to be 2.4 weight percent, $T_2/T_1$ will be 0.37, as read from FIG. 1. With this value for the temperature ratio, the required $T_1$ is 427° K.

Although the preferred embodiments have been described in detail, it is contemplated that modifications of the process may be made and that some features may be employed without others, all within the spirit and scope of the invention as set forth herein.

This is a continuation-in-part application of copending application Serial No. 400,385, filed December 24, 1953, in the name of R. M. Milton, now abandoned.

What is claimed is:

1. A process for separating normal unsaturated aliphatic hydrocarbons containing less than four carbon atoms per molecule from a vapor mixture containing said unsaturated aliphatic hydrocarbons and at least one member selected from the group consisting of methane, ethane, oxygen, hydrogen and nitrogen, which comprises contacting said vapor mixture with a bed of at least partially dehydrated crystalline zeolite A adsorbent material having a pore size of at least about 4 angstroms and being sufficiently large to receive all members of said group, and thereafter discharging the unsaturated aliphatic hydrocarbon-depleted vapor from the bed.

2. A process for separating normal unsaturated aliphatic hydrocarbons containing less than four carbon atoms per molecule from a vapor mixture containing said unsaturated aliphatic hydrocarbons and at least one member selected from the group consisting of methane, ethane, propane, oxygene, hydrogen and nitrogen, which comprises contacting said vapor mixture with a bed of at least partially dehydrated crystalline zeolite A adsorbent material, said material having pores capable of adsorbing molecules that have a maximum dimension of the minimum projected cross-section up to about 5.5 angstroms and sufficiently large to receive all members of said group, and thereafter discharging the unsaturated aliphatic hydrocarbon-depleted vapor from the bed.

3. A process as described in claim 2, in which an olefin is the normal unsaturated aliphatic hydrocarbon.

4. A process as described in claim 2 in which acetylene is the normal unsaturated aliphatic hydrocarbon.

5. A process as described in claim 2 in which ethylene is the normal unsaturated aliphatic hydrocarbon.

6. A process as described in claim 2 in which propylene is the normal unsaturated aliphatic hydrocarbon.

7. A process for separating normal unsaturated aliphatic hydrocarbons containing less than four carbon atoms per molecule from a vapor mixture with methane which comprises contacting said vapor mixture with a bed of at least partially dehydrated crystalline zeolite A adsorbent material having a pore size of at least about 4 A thereby adsorbing said unsaturates, and thereafter discharging the unsaturate-depleted vapor stream from said bed.

8. A process for separating normal unsaturated aliphatic hydrocarbons containing less than four carbon atoms per molecule from a vapor mixture with ethane which comprises contacting said vapor mixture with a bed of at least partially dehydrated crystalline zeolite A adsorbent material having a pore size of at least about 4 A thereby adsorbing said unsaturates, and thereafter discharging the unsaturate-depleted vapor stream from said bed.

(References on following page)

References Cited in the file of this patent

UNITED STATES PATENTS

| | | |
|---|---|---|
| 1,813,174 | Lamb | July 7, 1931 |
| 2,944,092 | Feldbauer et al. | July 5, 1960 |

OTHER REFERENCES

"Separation of Mixtures Using Zeolites As Molecular Sieves, Part I. Three Classes of Molecular Sieve Zeolite," by R. M. Barrer; J. Soc. Chem. Ind., May 1945, vol. 64, pp. 130–135.

"Molecular-Sieve Action of Solids," by R. M. Barrer, Quarterly Reviews, London Chemical Society, 1949, vol. III, pp. 293–320.

"The Hydrothermal Chemistry of Silicates, Part I," by Barrer et al., Journal of the Chemical Society, 1951, pp. 1267–1278.

Crystalline Zeolites. I. The properties of a New Synthetic Zeolite, Type A, by D. W. Breck et al., J of A.C.S., vol. 78, No. 23, Dec. 8, 1956, pp. 5963–5970.